United States Patent [19]

Underhill

[11] Patent Number: 4,760,324
[45] Date of Patent: Jul. 26, 1988

[54] NON-DISSIPATIVE SNUBBER CIRCUIT FOR HIGH-EFFICIENCY SWITCHING POWER SUPPLIES

[75] Inventor: Mark J. Underhill, Marilla, N.Y.

[73] Assignee: Raytheon Company, Lexington, Mass.

[21] Appl. No.: 105,418

[22] Filed: Oct. 7, 1987

[51] Int. Cl.$^4$ ............................................. G05F 1/569
[52] U.S. Cl. ..................................... 323/282; 363/50; 363/56; 363/63
[58] Field of Search ............... 323/282, 284, 285, 290; 363/50, 56, 63

[56] References Cited

U.S. PATENT DOCUMENTS

| | | | |
|---|---|---|---|
| 3,628,047 | 12/1971 | Cronin et al. | 363/56 X |
| 4,016,461 | 4/1977 | Roland | 323/282 X |
| 4,281,377 | 7/1981 | Evans | 363/63 |
| 4,403,269 | 9/1983 | Carroll | 363/56 X |
| 4,607,322 | 8/1986 | Henderson | 363/56 |
| 4,626,980 | 12/1986 | McGuire | 363/56 |
| 4,639,849 | 1/1987 | Norworolski et al. | 363/56 |
| 4,691,270 | 9/1987 | Pruitt | 363/56 |

OTHER PUBLICATIONS

Whitcomb, "Designing Non-Dissipative Current Snubbers for Switched Mode Converters", Proceedings of the 6th National Solid-State Power Conversion Conference, May 1979, pp. B1-1 to B1-6.

"High-Frequency Switching Power Supplies: Theory and Design"; N.Y.; George Chryssis; McGraw-Hill Book Co., 1984; pp. 60-63.

"Design of Solid-State Power Supplies, 2nd Edition"; N.Y.; E.R. Hnatek; Van Nostrand Reinhold Co., 1981; pp. 290-292.

"Voltage Regulator Handbook"; National Semiconductor Corp., Santa Clara, CA, 1981; pp. 10-151 to 154.

Primary Examiner—Peter S. Wong
Attorney, Agent, or Firm—Christopher L. Maginniss; Richard Sharkansky

[57] ABSTRACT

A high efficiency switching power supply includes a non-dissipative snubber circuit which provides dual polarity power utilized by a driver of the switching transistor. The snubber circuit, protecting the switching transistor in the supply and utilizing an inductor for storing energy normally dissipated as heat, charges filter capacitors with the stored energy to provide the dual polarity power sources. Zener diodes, paralelling the filter capacitors, regulate the power sources to provide output voltages sufficient for the driver to ensure saturation and cut-off of the switching transistor. The power sources allow the driver to directly drive the switching transistor for a high efficiency, small size, low cost and lightweight switching power supply.

9 Claims, 3 Drawing Sheets

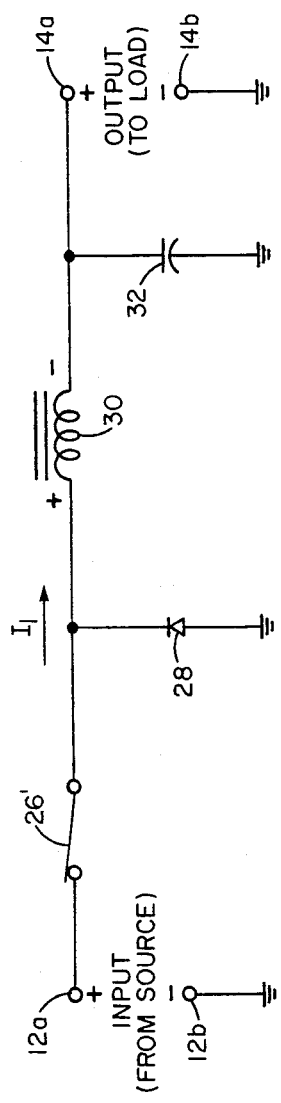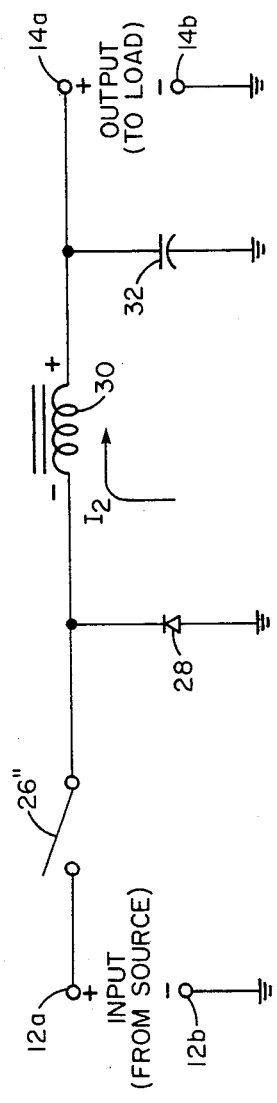

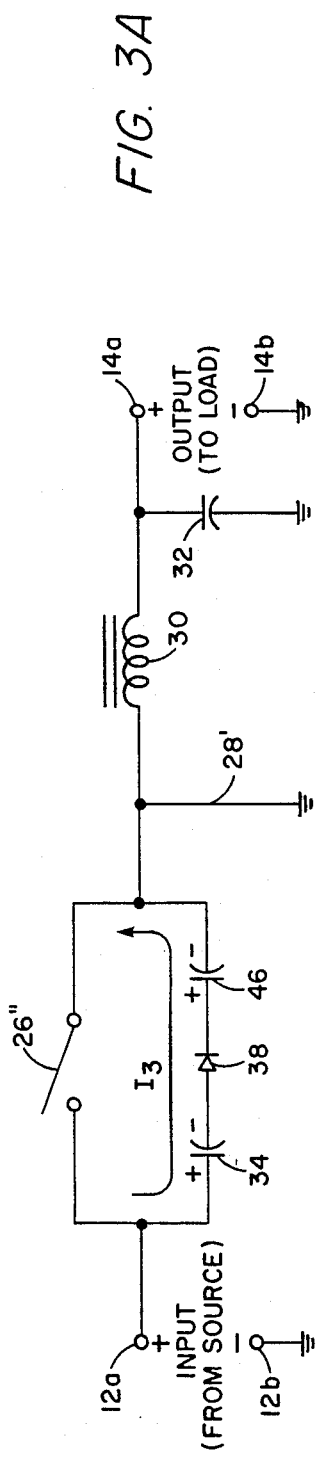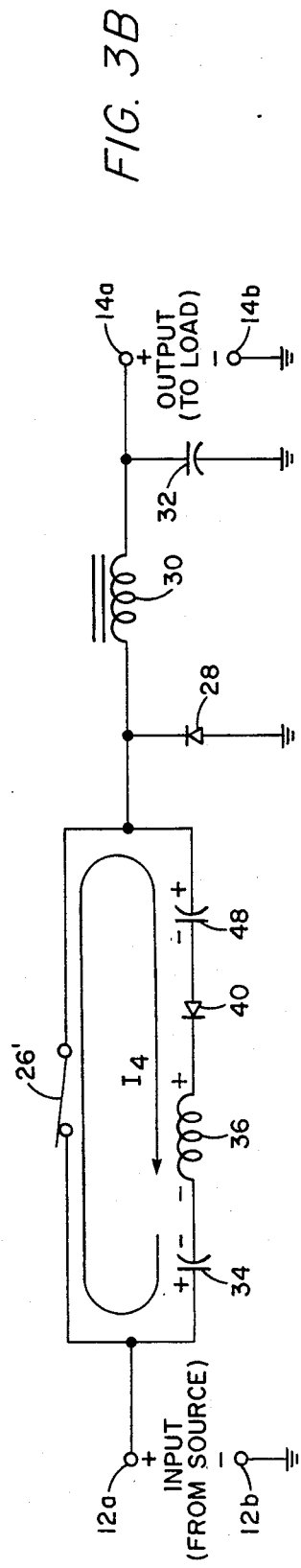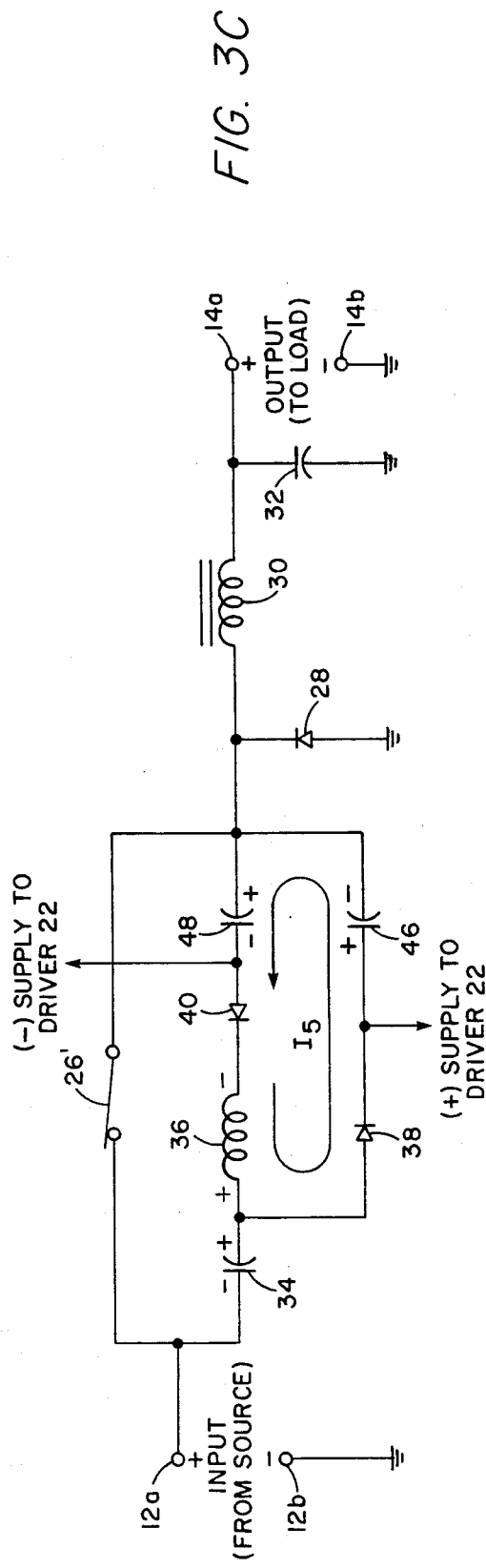

NON-DISSIPATIVE SNUBBER CIRCUIT FOR HIGH-EFFICIENCY SWITCHING POWER SUPPLIES

BACKGROUND OF THE INVENTION

This invention relates generally to power supplies and, more particularly, to switching power supplies including snubber circuits.

As is known in the art, switching power supplies are frequently used to convert an input voltage from an unregulated source into a regulated voltage at an output thereof. In one such power supply, there is produced a feedback control signal related to the difference between the actual voltage at the output and the desired output voltage. The power supply includes a generator for producing a signal comprising a train of pulses, the width to the pulses being controlled or modulated in accordance with the control signal. A switching transistor responsive to the pulses couples the unregulated input voltage source to and from a load device via an inductor for a time duration in accordance with each pulse width.

During the portion of each period of the pulse train when the switching transistor is enabling current from the input voltage source, that current is used to store energy in the series-connected inductor and to charge a parallel-connected capacitor, as well as supplying the load device. During the remaining portion of each period, i.e., while the switching transistor decouples the supply voltage from the inductor, the polarity across the inductor reverses because of the collapsing magnetic field, and the inductor begins to supply both the load current and the charging current to the capacitor. As the energy store in the inductor discharges, its current falls off and the capacitor begins to supply current to the load. The switched voltage at the transistor side of the inductor is smoothed by the filter comprising the inductor and capacitor and, in the steady-state, this switched voltage becomes the desired output voltage.

With such arrangement, as the switching transistor decouples the input voltage source from the inductor, the voltage across the switching transistor rises rapidly as the polarity across the inductor reverses; however, the current flowing through the switching transistor does not immediately fall to zero, due to a delay (turn-off time) inherent to the switching transistor. The product of voltage across the switching transistor and the current flowing through it during the turn-off time may translate to excessive power dissipation (heat) by the switching transistor. Therefore, for a switching power supply of this type, the power handling capacity of the switching transistor must be increased.

One technique sometimes used to reduce the power handling requirement of the switching transistor is to provide a so-called "snubber circuit." An exemplary dissipative snubber circuit design is disclosed in "High-Frequency Switching Power Supplies: Theory and Design", by G. Chryssis, 1984, pp. 60–63. In this example, the snubber circuit is disposed across the switching transistor and provides a path for the current normally passing through the switching transistor and dissipates the stored energy in a passive (i.e., resistive) load when the switching transistor is conducting. Thus, the snubber circuit comprises a series-coupled resistor and capactior, with the capacitor storing energy during the transistor turn-off period and the resistor dissipating the stored energy as heat. This circuit reduces the power handling requirement of the switching transistor; however, the power conversion efficiency of the power supply is slightly degraded.

An alternative approach to reducing the power-handling capability of the switching transistor is to reduce the turn-off delay of the switching transistor. This is sometimes accomplished by biasing the control electrode of the switching transistor with a voltage sufficient to ensure rapid cut-off, e.g., a negative voltage applied to the gate electrode of an N-channel field effect transistor (FET). However, this approach requires a separate power source to provide the negative voltage.

A non-dissipative snubber disclosed in "Design of Solid-State Power Supplies", by E. R. Hnatek, 1981, pp. 290–292, more particularly, FIG. 7-29, allows energy stored in the snubber to be utilized by the switching power supply instead of being dissipated as heat. However, only a single positive output voltage is available for use and an additional supply would still be needed to provide a negative voltage to ensure cut-off. Additionally, such switching power supplies generally require a lare pulse transformer for driving the switching transistor. The pulse transformer isolates control circuits (e.g., the pulse generator) of the power supply from the switching transistor. Inefficiencies of transformer coupling necessitate use of a high-power driver. Furthermore, a large pulse transformer is required to ensure that the core of that transformer does not saturate during a pulse. Since the high-power driver does not contribute to power supplied by the switching power supply, the overall efficiency of the power supply is thereby reduced. Additionally, the high-power driver and pulse transformer increase the size, weight and cost of the power supply.

SUMMARY OF THE INVENTION

It is therefore a primary object of this invention to provide a high-efficiency switching power supply having an improved snubber circuit.

It is a further object of this invention to provide an improved high-efficiency switching power supply suitable for driving a switching transistor in such circuit into cut-off.

These objects and other objects of this invention are obtained generally by providing a switching power supply comprising: a switching transistor; snubbing means for storing energy during the cut-off condition of the switching transistor; and regulator means coupled to the snubbing means for receivng the stored energy during the saturation condition of the switching transistor, and for supplying a pair of oppositely poled voltages to drive the switching transistor between the saturation and cut-off conditions. With such arrangement, the snubber circuit, in addition to reducing the power handling requirement of the switching transistor, provides a voltage source of proper polarity to ensure sufficient reverse bias of the switching transistor to place it in a cut-off condition without requiring an additional power supply.

In accordance with a preferred embodiment of the invention the improved snubber circuit comprises: a capacitor disposed between a first output terminal of the switching transistor and a junction, an inductor coupled to the junction, a first diode coupled to the junction and a second diode serially coupled to the inductor. A first voltage regulator is disposed between the first diode means and a second output terminal of the switching transistor, and a second voltage regulator is disposed between the second diode and the second output terminal of the switching transistor. Energy stored in the capacitor, normally dissipated by a resistor in the prior art, is transferred to the inductor to supply energy to the first and second voltage regulators. Each of the voltage regulators provides a predetermined voltage for a low power driver of the switching transistor. By utilizing energy normally dissipated by the snubber circuit to power the driver, efficiency of the switching power supply is increased, the high-power driver is eliminated and the pulse transformer is greatly reduced in size and weight.

BRIEF DESCRIPTION OF THE DRAWINGS

The foregoing features of this invention, as well as the invention itself, may be more fully understood from the following detailed description of the drawings, in which:

FIGS. 2A and 2B are simplified schematic diagrams useful in explaining the operation of a basic switching power supply according to the prior art; and FIGS. 3A, 3B and 3C are simplified schematic diagrams of a portion of the switching power supply useful in explaining the operation of the snubber circuit of the present invention.

DETAILED DESCRIPTION OF THE PREFERRRED EMBODIMENT

Figure 1:
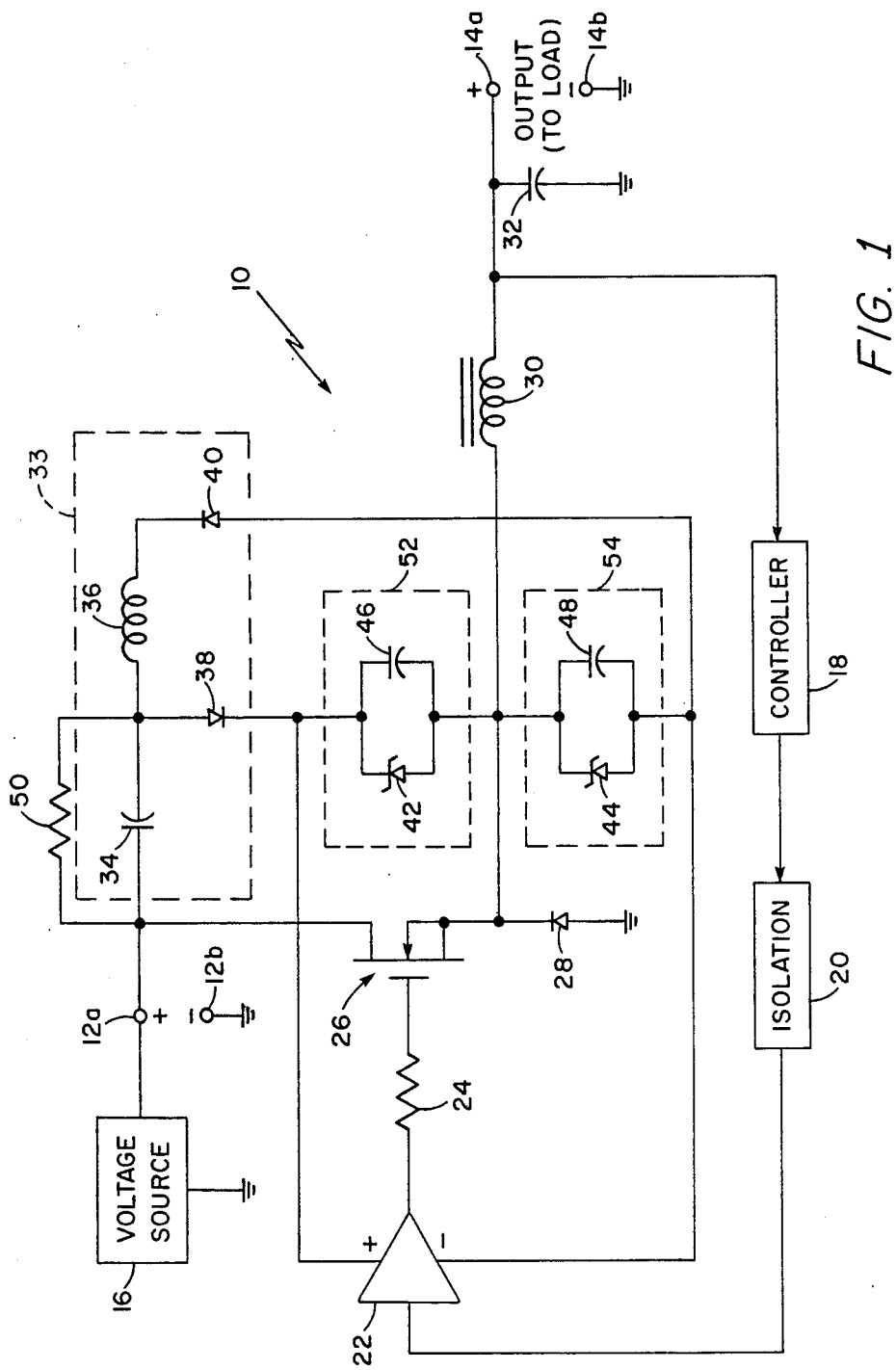
FIG. 1 is a simplified schematic diagram of a high-efficiency switching power supply including a snubber circuit.

Referring to FIG. 1, there is shown a schematic circuit diagram of a high-efficiency switching power supply 10, also commonly referred to as a buck, forward or step-down switching power supply. Power supply 10 receives a dc input voltage across input ports 12a and 12b, typically from a voltage source 16, and provides therefrom a desired dc voltage across output ports 14a and 14b.

Controller 18 is responsive to the voltage level at output port 14a for generating pulses into isolation device 20. In particular, the pulse signal provided from controller 18 is of relatively constant frequency, but the pulse widths vary in accordance with the voltage level at port 14a. Controller 18 may be a regulating pulse width modulator, similar to type LM1524, sold by National Semiconductor Corporation, Santa Clara, Calif.

The pulse signal output from controller 18 drives isolation device 20 which provides copper-path isolation between the power supply output voltage and driver 22, while coupling pulses through to the input terminal of driver 22. Isolation device 20 may typically be a pulse transformer or an optical isolator,. An illustrative optical isolator may comprise an 8-pin dual in-line package (DIP) containing a light-emitting diode (LED) and a photo-transistor, similar to type 6N135, sold by Hewlett-Packard Company, Palo Alto, Calif.

Driver 22, responsive to the pulse signal received from isolation device 20, is preferably a high-speed, low-power driver designed to handle highly capacitive loads. Driver 22 may be a power MOSFET driver similar to type TSC427, sold by Teledyne Semiconductor, Mountain View, Calif. Driver 22 provides amplification of the pulses received from isolation device 20 to drive the gate electrode of FET 26 through series resistor 24, which limits the current flow into the gate of FET 26.

FET 26, diode 28, storage inductor 30, and filter capactior 32 comprise the basic switching ower supply as discussed above in the prior art. Component values for these elements are well known, and design equations and examples are shown in "Voltage Regulator Handbook," compiled by National Semiconductor Corporation, 1981, pp. 10-151 through 10-154. In the present example, FET 26 may be similar to type IRF450, sold by International Rectifier Corporation, El Segundo, Calif., and diode 28 may be similar to type SDR606J, sold by Solid State Devices, Inc., La Mirada, Calif.

The operation of the basic switching power supply is illustrated by reference to FIGS. 2A and 2B, which include the input voltage ports 12a,b, output voltage ports 14a,b, diode 28, inductor 30, and capacitor 32, as shown in FIG. 1. FET 26, of FIG. 1, however, is represented in FIGS. 2A and 2B as open switch 26" or closed switch 26'.

FIG. 2A represents the phase during which the voltage across output ports 14a,b is less than desired. During this phase, the switching transistor 26 is saturated by a pulse from controller 18 and functions as a shorted switch 26'. The voltage across input ports 12a,b is coupled to capacitor 32 and output port 14a via inductor 30. Current $I_1$, flowing from the source through port 12a and shorted switch 26', causes energy to be stored in inductor 30, builds up a voltage across capacitor 32 and supplies current to a load device through port 14a. Since the voltage at the cathode of diode 28 is substantilly equal to the positive voltage at port 12a, diode 28 remains reverse biased during this phase.

When the pulse from controller 18 terminates, transistor 26 switches to a high-impedance state, as represented by open switch 26" in FIG. 2B, thereby decoupling the voltage source from inductor 30. The energy stored in inductor 30 tends to continue the current flow in the same direction, and the voltage polarity across inductor 30 reverses. This reversal drives the cathode of diode 28 negative, forward biasing diode 28 , and current $I_2$ flows through diode 28 and inductor 30 into capacitor 32 and output port 14a. As the energy in inductor 30 discharges, current $I_2$ drops, and capacitor 32 begins to discharge current into the load device through port 14a.

In accordance with the principles of the present invention, a snubber circuit is shown in FIG. 1 for use with the above-described switching power supply 10. Capacitor 34, inductor 36 and didodes 38 and 40 form a snubber circuit 33 for switching transistor 26. Zener diodes 42 and 44 and filter capacitors 46 and 48 comprise dual voltage regulators 52, 54 for driver 22. Capacitor 34 is the snubber capacitor for transistor 26. Inductor 36, in combination with diodes 38 and 40, transfers the energy stored in snubber capacitor 34 to capacitors 46 and 48 to be used in the dual voltage regulators 52 and 54 supplying power to driver 22. Diode 38 may be, for example, similar to type SDR3J, sold by Solid State Devices, and diode 40 may be similar to type 1N5811.

FIGS. 3A, 3B and 3C are useful in explaining the operation of the snubber circuit of the present invention. This operation is segmented into three phases. As was the case for FIGS. 2A and 2B, switching transistor 26 is represented either as shorted switch 26' or open switch 26".

The first phase of operation, represented by FIG. 3A, is the snubbing process. Switching transistor 26 is in its high impedance state (as when no pulse from driver 22 is present) and is shown as an open switch 26''. As was seen earlier with relation to FIG. 2B, diode 28 is forward biased under these conditions; hence, it is represented in FIG. 3A as a virtual short to ground 28'. Snubbing current I₃ flows from the unregulated source coupled across ports 12a,b through snubbing capacitor 34, diode 38, and capacitor 46 to the juncture of inductor 30 and forward biased diode 28'. Current I₃, passing as shown through capacitors 34 and 36 charges then with the voltage polarities shown in the figure. However, due to the capacitance ratio of capacitor 46 (and, similarly, capacitor 48 as shown in FIG. 1) to capacitor 34, which ratio may be in the order of 100-to-1, most of the energy from current I₃ is stored across capacitor 34.

In the second phase of operation, represented by FIG. 3B, switching transistor 26 is in its low impedance state (as when a pulse from driver 22 is present) and is shown as a closed switch 26'. As was seen earlier with relation to FIG. 2A, diode 28 is reverse biased under these conditions. The energy stored in capacitor 34 is resonantly transferred as current I₄ to inductor 36, through the resonant circuit comprising capacitor 34, closed switch 26', capacitor 48, diode 40 and inductor 36. When the charge is drained from capacitor 34, the tendency of inductor 36 to maintain current I₄ in the same direction, charges up the voltage across capacitor 34 with reverse polarity.

The reversed voltage builds up across capacitor 34 until, as seen in FIG. 3C, it is sufficiently greater than the voltage across capacitor 46 to forward bias diode 38. As diode 38 conducts, the circuit resonance is interrupted, and the current I₅ supplied from inductor 36 now flows in the loop comprising diode 38, capacitor 46, capacitor 48, diode 40 and inductor 36. Current I₅ continues to flow as shown, decreasing linearly to zero while charging capactiors 46 and 48. When closed switch 26' opens, the operation repeats with the snubbing process as described in relation to FIG. 3A.

Turning back to FIG. 1, voltage regulator 52 supplies the positive (+) voltage to driver 22 and comprises the parallel combination of zener diode 42 and capacitor 46; voltage regulator 54 supplies the negative (−) voltage to driver 22 and comprises the parallel combination of zener diode 44 and capacitor 48. Zener diodes 42 and 44 limit and regulate the voltages across corresponding capacitors 46 and 48. The breakdown voltage of zener diode 42 is chosen such that the output pulse of driver 22 has sufficient amplitude to ensure saturation of switching transistor 26. Conversely, the breakdown voltage of zener diode 44 is chose to ensure complete turn-off of transistor 26 in the absence of a pulse from driver 22. In the present example, zener diodes 42 and 44 may both be similar to type IN4957, having a breakdown voltage of 9.1 volts.

The value of capacitor 34 is determined as in the case of conventional dissipative snubber circuits, an exemplary design being disclosed in "High Frequency Switching Power Supplies: Theory and Design," by G. Chryssis, 1984, pp. 60–63. The inductance L of inductor 36 and the capacitance C of capacitor 34 limit the minimum time transistor 26 is saturated ($t_{on}$(min)) to be approximately one-quarter the resonant period of inductor 36 and capacitor 34. That is, $$t_{on}(\min) = (\tfrac{1}{4})2\pi\sqrt{LC}.$$

This ensures that all of the energy stored in capacitor 34 is transferred to inductor 36 before switching transistor 26 turns off. A limitation in the choice of the inductance L of inductor 36 is the peak current flow ($I_{pk}$) therethrough, specified by:

$$I_{pk} = V_i/\sqrt{L/C},$$

where $V_i$ is the voltage across input ports 12a,b and C is the capacitance of capacitor 34.

Resistor 50 provides sufficient current on power-up of the supply 10 such that driver 22 will be able to drive transistor 26 with the first pulses from controller 18. It should be noted that the resistance of resistor 50 should assume a maximum value in order to minimize the power dissipation in resistor 34, while ensuring reliable start-up of the supply 10.

A switching power supply for providing an output of 170 volts at 500 watts from an input voltage source at 270 volts, and switching at a rate of 40 KHz, has been built and tested with the following component values:
Resistor 24: 10 ohms,
Resistor 50: 160 kilohms,
Capacitor 32: 50 μF,
Capacitor 34: 470 pF,
Capacitors 46,48: 47 μF,
Inductor 30: 2.5 mH, and
Inductor 36: 160 μH.

While the principles of the present invention have been demonstrated with particular regard to the illustrated structure of the figures, it will be recognized that various departures from such illustrative structure may be undertaken in practice of the invention. The scope of this invention is not intended to be limited to the sturcture disclosed herein but should instead be gauged by the breadth of the claims which follow.

What is claimed is:

1. A switching power supply producing a regulated output voltage, said power supply comprising:
    a switching transistor;
    snubbing means for storing energy during the cut-off condition of said switching transistor; and
    regulator means coupled to said snubbing means for receiving said stored energy during the saturation condition of said switching transistor, and for supplying a pair of oppositely poled voltages to drive said switching transistor between the saturation and cut-off conditions.

2. The power supply according to claim 1 wherein said regulator means comprises:
    first voltage regulator means, coupled to a first one of the output terminals of said switching transistor and said snubbing means, for filtering and regulating to a first predetermined voltage said energy received from said snubbing means; and
    second voltage regulator means, coupled to said first one of the output terminals of said switching transistor and said snubbing means, for filtering and regulating to a second predetermined voltage said energy received from said snubbing means, said first and second predetermined voltages, being of opposite polarities.

3. The power supply according to claim 2, wherein said snubbing means comprises:
    capacitor means disposed between a second one of the output terminals of said switching transistor and a junction;
    inductor means coupled to said junction;
    first diode means coupled to said junction; and second diode means serially coupled to said inductor means, wherein said first diode means coupled to said first voltage regulating means, and said second diode means coupled to said second voltage regulating means.

4. The power supply according to claim 3, wherein the minimum time duration of the saturation condition of said switching transistor is related to the capacitance (C) of said capacitor means and said inductance (L) of said inductor means by the equation:

$$T_{on}(\text{min}) = (\tfrac{1}{2})\pi\sqrt{LC}.$$

5. The power supply according to claim 2, further comprising:
  controller means responsive to the output voltage for generating pulses of varying width; and
  driver means, powered by said first and second voltage regulator means, for driving the control terminal of said switching transistor from the pulses generated by said controller means, wherein said controller means maintains the output voltage at a predetermined value by varying the width of the generated pulses.

6. A switching power supply producing a regulated output voltage, said power supply having a circuit for absorbing energy during turn-off of a switching transistor in said power supply and for providing dual polarity power to a driver of said switching transistor, said switching transistor having first and second output terminals and having a control terminal for controlling the conductivity between said two output terminals, said driver coupling to the control terminal of said switching transistor, said circuit comprising:
  capacitor means disposed between said first output terminal of said switching transistor and a junction;
  inductor means coupled to said junction;
  first diode means coupled to said junction;
  first voltage regulating means, disposed between said first diode means and said second output terminal of said switching transistor, for filtering and regulating to a predetermined voltage level the power coupled thereto by said first diode means;
  second diode means serially coupled to said inductor means; and
  second voltage regulating means, disposed between said second diode means and said second output terminal of said switching transistor, for filtering and regulating to a predetermined voltage level the power coupled thereto by said second diode means;
  wherein the voltage level from said first regulating means is sufficient to ensure that said driver of said switching transistor can drive said switching transistor into saturation condition, and the voltage from said second regulating means is sufficient to ensure that said driver of said switching transistor can cut-off said switching transistor.

7. The circuit in the power supply according to claim 6, wherein said first and second voltage regulating means each comprises the parallel combination of zener diode means and storage capacitor means.

8. The circuit in the power supply according to claim 7, wherein the minimum time duration of the saturation condition of said switching transistor, $t_{on}(\text{min})$, is related to the capacitance (C) of said capacitor means and the inductance (L) of said inductor means by the equation:

$$t_{on}(\text{min}) = (\tfrac{1}{2})\pi\sqrt{LC}.$$

9. The power supply according to claim 8, wherein said switching transistor is a field effect transistor.

* * * * *